(12) United States Patent
Sumner, Sr.

(10) Patent No.: US 8,037,812 B1
(45) Date of Patent: Oct. 18, 2011

(54) BOTTOM OPENING FRYER BASKET

(76) Inventor: Douglas Arthur Sumner, Sr., Sherwood, OR (US)

( * ) Notice: Subject to any disclaimer, the term of this patent is extended or adjusted under 35 U.S.C. 154(b) by 868 days.

(21) Appl. No.: 12/076,080

(22) Filed: Mar. 13, 2008

Related U.S. Application Data

(60) Provisional application No. 60/915,651, filed on May 2, 2007.

(51) Int. Cl.
*A47J 37/12* (2006.01)

(52) U.S. Cl. .............. 99/407; 99/413; 99/450; 220/494; 220/607

(58) Field of Classification Search .................... 99/407, 99/413, 450, 410, 411, 412, 414, 415; 220/607, 220/494, 601; 221/194, 295, 306; 211/181.1
See application file for complete search history.

(56) References Cited

U.S. PATENT DOCUMENTS

| | | | |
|---|---|---|---|
| 532,226 A * | 1/1895 | Baumgardner | 99/407 |
| 1,390,772 A | 9/1921 | Fontaine et al. | |
| 1,491,974 A | 4/1924 | Shaffer | |
| 1,576,124 A | 3/1926 | Wills | |
| 1,582,109 A | 4/1926 | Wills | |
| 1,643,733 A | 7/1927 | Wills | |
| 2,138,967 A * | 12/1938 | Harris | 294/26.5 |
| 2,186,855 A | 1/1940 | Baccarini | |
| 2,588,614 A | 3/1952 | Capra | |
| 3,007,733 A | 11/1961 | Ota | |
| 3,047,329 A * | 7/1962 | Gunderson, Jr | 294/68.21 |
| 3,430,553 A | 3/1969 | Di Pietro | |
| 3,442,423 A | 5/1969 | Cozad | |
| 3,448,677 A | 6/1969 | Dexters | |
| 3,893,598 A | 7/1975 | Fuss | |
| 3,908,872 A | 9/1975 | Cox | |
| 3,975,997 A | 8/1976 | DiPietro | |
| 4,586,429 A * | 5/1986 | Hawkins | 99/407 |
| 4,832,226 A | 5/1989 | Leon | |
| 5,282,498 A | 2/1994 | Cahlander | |
| 5,305,686 A | 4/1994 | Svensson | |
| 6,398,066 B1 | 6/2002 | Mullins | |
| 7,775,156 B2 * | 8/2010 | Sus et al. | 99/410 |
| 2007/0251517 A1 | 11/2007 | Sus et al. | |
| 2008/0124438 A1* | 5/2008 | Forte et al. | 426/389 |

* cited by examiner

*Primary Examiner* — Reginald L Alexander
(74) *Attorney, Agent, or Firm* — Dowell & Dowell, PC

(57) ABSTRACT

A fryer basket having at least one bottom wall or panel that is normally retained in a closed relationship relative to side walls of the basket but which is released to pivot to an open position upon operation of a latching mechanism that is operable adjacent to a handgrip of a handle connected to the basket.

12 Claims, 3 Drawing Sheets

BOTTOM OPENING FRYER BASKET

BACKGROUND OF THE INVENTION

1. Field of the Invention

The present invention relates to fryer baskets and more particularly to heavy duty or commercial long handle fryer baskets that are used to support food items being cooked by being immersed in cooking oil within a fryer.

2. Brief Description of the Related Art

Commercial fryer baskets, also known as deep fat fryer baskets, include an open mesh-like structure that forms a receiver or container for retaining a food product to be cooked by being immersed in a fryer vat or tub. The receiver or container is welded or otherwise secured to an elongated handle that is designed to extend outwardly beyond the fryer vat or tub so that the handle may be safely grasped without a person having to extend their hands above hot oil within the fryer vat or tub.

In use, a conventional fryer basket is initially filled with a food product such as french fries, coated onion rings, chicken, and the like, after which the basket is lowered into a vat or tub of heated cooking oil until seated such that the handle thereof extends outwardly from the fryer vat or tub. After the food product is cooked, a worker responsible for the fried product engages the handle of the basket and elevates the basket from the vat of cooking oil. The basket must normally be retained above the vat of cooking oil for a brief period so that oil from the basket and the food product may drip back into the vat. Once the food product is sufficiently drained, the food product must be removed from the fryer basket. The food product is removed by the worker turning the basket upside down over a food retention bin or area so that the food product is discharged by gravity from an open top of the fryer basket.

The weight of long handle fryer baskets can very greatly from less than a pound to several pounds, or more, depending on the size of the basket and the food product being cooked. Further, because the weight of the basket and food product is at the end of the handle spaced from a workers hand(s) and wrist(s), the amount of stress being placed on the workers hand(s) and wrist(s) is considerable. Considering the number of times it may be necessary for a worker to rotate loaded fryer baskets to discharge food products during a given work shift, it is not unusual for workers to develop or experience hand, wrist and forearm pain from fatigued and strained muscles, ligaments, tendons and joints. Once a worker develops an injury, the chance of an accident occurring during the handling and manipulating of loaded fryer baskets is significantly increased.

In view of the foregoing, there is a need to provide a new type of long handle fryer basket that prevents muscle, ligament, tendon and joint strain and injury.

SUMMARY OF THE INVENTION

This invention is directed to a long handle fryer basket that does not have to be rotated to discharge product through the top opening therein but that includes at least one selectively pivotally opening bottom wall or panel that is opened by manipulation of a operating member provided adjacent a portion of the handle that is grasped by an individual to raise and lower the basket. A latch mechanism is mounted to the basket and includes a latch that is normally positioned along a lower portion of the fryer basket and engages the at least one pivotally opening bottom panel to thereby retain the bottom panel in a closed position to retain food product within the fryer basket. However, the latch is connected by a lever to the operating member so that when the operating member is triggered by an individual, the latch is moved free of the bottom panel, thereby permitting the bottom panel to pivot downwardly to create a discharge opening through which food product within the basket may be discharged.

Once food product has been discharged from the basket, by retaining the operating member in a position to retain the latch in the release position thereof, the opened bottom panel may be lowered against surface to thereby pivot the bottom panel to it's closed position. When the bottom panel is in the closed position, the latch is automatically moved to it's locked position retaining the movable bottom wall or panel portion in the closed position.

In a preferred embodiment of the invention, the bottom of the fryer basket is formed of two panels each of which is pivotally connected to one of the sides of the basket so as to be freely movable by gravity to vertically depending open positions when not being retained in their closed position by the latch. In these embodiments, a single latch is preferably used to simultaneously engage or disengage the pivotal bottom panels. In some embodiments, separate latches may be used to retain the panels in their closed positions.

Although the latch may have varying configurations, in the preferred embodiment shown, the latch is mounted at a lower end of a lever arm that is pivotally mounted to front wall or panel of the basket adjacent the handle. The lever arm extends upwardly and forward of the front panel of the basket to a free end having a operating or pusher pad secured thereto. The pad is positioned adjacent a handgrip of the handle that is used to manually lift and manipulate the basket. The pad is easily engaged by a person's finger or thumb to thereby urge the top of the lever arm toward the basket and thereby pivot the lever arm about a pivot point to move the latch forward of the movable bottom panels to the release position thereof so that the panels automatically open under their own weight. The latch is continuous urged toward the locked position thereof by a spring mechanism that is mounted to urge the lever arm to a position wherein the latch is positioned beneath and in engagement with the bottom panels.

It is the primary object of the present invention to provide a bottom dispensing fryer basket wherein cooked food product is discharged through a bottom of the fryer basket so that it is not necessary to rotate the basket to discharge food product therefrom.

It is another object of the invention to provide a fryer basket that is particularly beneficial for use in commercial cooking environments to reduce pain and injury to workers by preventing fatigue, stress and strain to muscles, tendons, joints and ligaments that results from the use of a conventional fryer that must be inverted to discharge product therefrom.

BRIEF DESCRIPTION OF THE DRAWINGS

A better understanding of the invention will be had with reference to the accompanying drawings wherein.

DESCRIPTION OF THE PREFERRED EMBODIMENT

Figure 1:
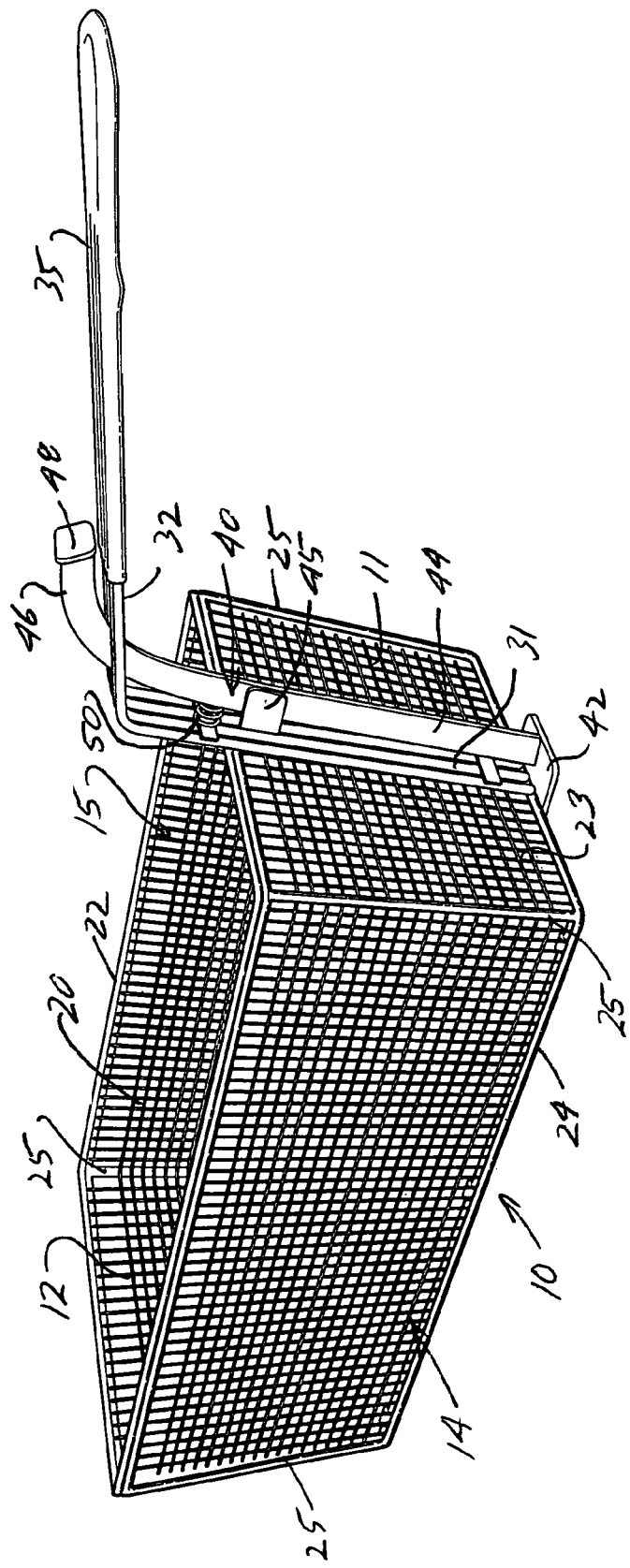
FIG. 1 is a front perspective view of one form of fryer basket in accordance with the teachings of the present invention with the bottom of the basket being closed and being retained in the closed position by a latch.

With continued reference to the drawings, a fryer basket 10 is shown that includes a front wall or panel 11, rear wall or panel 12, opposite side walls or panels 14 and 15 and a pair of movable bottom walls or panels 16 and 18. The fryer basket is shown as being open at the top 20, however, in some embodiments the top may be closed by one or more top panels or walls, not shown. The fryer basket 10 shown is similar to heavy duty long handle commercial fryer baskets and is formed of upper and lower stainless steel or other food grade metal frames 22 and 24 that are connected at the four corners of the basket by corner supports 25. The panels or walls are formed of horizontally and vertically extending rods 23 that are secured to one another to thereby define a plurality of openings therebetween. In some embodiments, the rods may be interweaved or formed of open wire mesh-like material, also being food grade materials.

Figure 3:
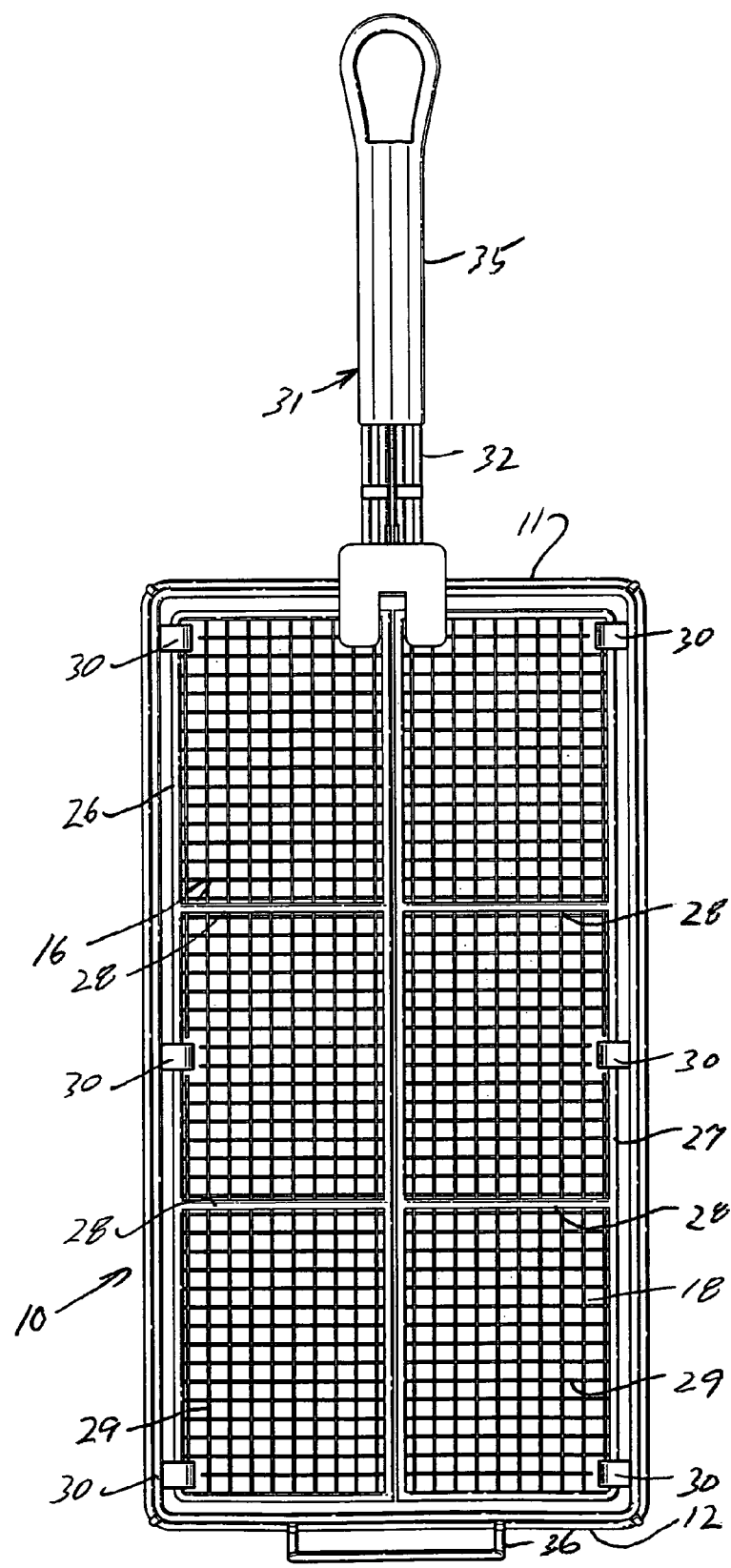
FIG. 3 is a bottom plan view of the fryer basket of FIG. 1 showing the latch in a locked or blocking position.

With reference to FIG. 3, the bottom walls or panels 16 and 18 include peripheral frames 26 and 27, respectively, that are reinforced by one or more cross members 28. The frames support generally perpendicularly oriented rods 29, which are similar to those of the side and front and rear walls or panels.

The side walls and front and rear walls are shown as being fixedly secured to one another, however, the bottom walls or panels 16 and 18 are pivotally mounted to lower edges of the side walls by mounting rings 30. The mounting rings 30 permit the bottom panels to pivot freely under their own weight to open positions, as shown in FIG. 2, when the bottom panels are not retained in their closed position, as shown in FIGS. 1 and 3, by a retention latch as will be described in greater detail hereinafter.

A handle 31 includes an inner portion 32 that is welded or otherwise secured to the front wall of the basket and an outwardly extending portion 33 that defines a handgrip 35 that is spaced forward of the front wall of the fryer basket. The handle is also formed of a food grade metal such as stainless steel. A U-shaped support 36 is welded or otherwise secured to the lower portion of the rear wall 12 for purposes of engaging a conventional support inside of a commercial fryer.

To normally retain the bottom panels or walls 16 and 18 in their closed position, as shown in FIGS. 1 and 3, a latch assembly 40 is mounted to the front wall of the basket. The latch assembly includes a latch member or plate 42 that engages with a lower surface of one end of the peripheral frames 26 and 27, as shown in FIG. 3. Although the latch member is shown as being bifurcated, the latch member may be formed as a continuous plate. The latch member is welded or otherwise secured to a lower end of a lever member 44 that is pivotally mounted to a bracket 45 welded or otherwise secured to the front wall of the basket. The lever member extends upwardly from the latch member to an upper portion 46 that extends forward of the front wall of the fryer basket to a point or area adjacent the handgrip 35 of the handle 31 where the lever member is terminated by a push pad or operating member 48.

Figure 2:
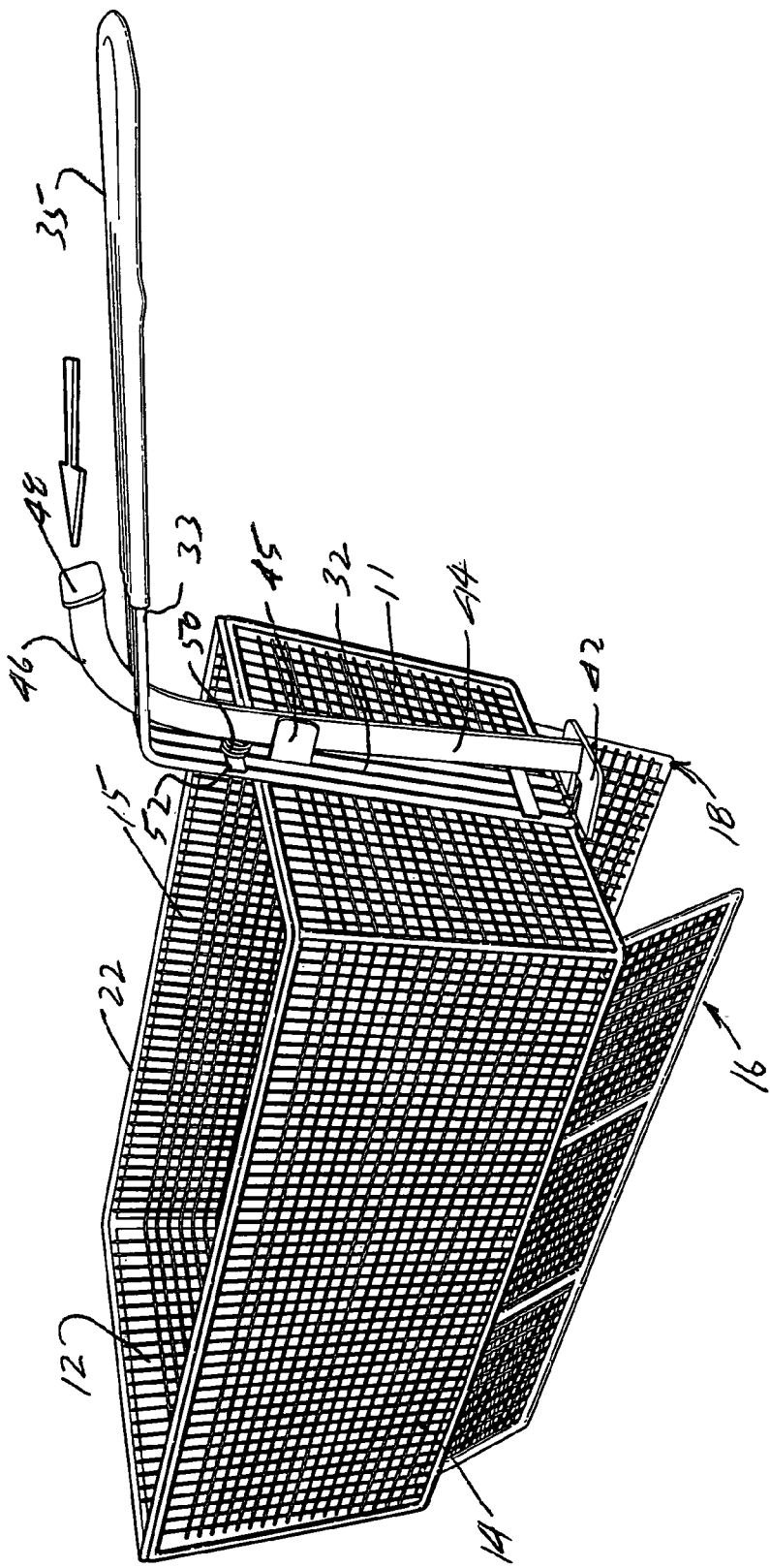
FIG. 2 is a front perspective view similar to FIG. 1 except showing the bottom panels depending from the basket in an open position thereof to thereby permit discharge of food products from the basket.

The latching mechanism is pivotally movable from a first position wherein the latch member is in a locked or blocking positioned beneath the bottom panels of the fryer basket, see FIGS. 1 and 3, to a second position wherein the latch member is pivoted away from the bottom panels and forward of the front wall 11 to an open position, see FIG. 2. When the latch member is in the open position thereof, the bottom panels pivotally open freely by gravity. The latching mechanism also includes a spring element 50 that is mounted at 52 above the bracket 45 so as to exert a constant force to urge the latch member toward the locked or blocking position thereof. As with the other components of the fryer basket, the latching mechanism is formed of a food grade metal or material.

In the use of the fryer basket, with the bottom panels 16 and 18 in their closed position as shown in FIGS. 1 and 3, food product may be placed within the basket 10 and the basket placed in a hot oil fryer. After the product is cooked, a person lifts the basket by grasping the handgrip 35. After sufficient drain time, the basket is positioned over a food collection area at which time the latching mechanism is operated by pushing on the push pad or operating member 48 in a direction as shown by the arrow in FIG. 2 thereby pivoting the lever member against the spring element 50 and moving the latch member to the open position thereof so that the bottom panels drop open discharging the cooked food product from the basket. With the push member still being urged toward the basket, the basket is lowered into engagement with a surface so that the bottom panels pivot back to their closed position. Upon release of the push pad or operating member, the latch member will pivot beneath the bottom panels to the closed and locking or blocking position thereof to thereby retain the bottom panels in their closed position.

Due to the manner in which the bottom panels are pivotally connected to the lower edges of the side walls of the basket, when the bottom panels are released by movement of the latch member moving to the unblocking or open position thereof, the panels will open to such an extent that the entire contents of the basket will be automatically discharged without having to shake or further manipulate the basket, thus ensuring, minimal stress on a persons muscles, ligaments and joints.

As previously noted, the bottom may be formed of one or more panels that are pivotally movable relative to the basket with only the preferred embodiment at the time of the filing of the application being shown in the drawings. In addition, it is possible that the bottom wall or panel or walls or panels may be pivotally mounted to the front or rear walls as opposed to the side walls as shown and described.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A fryer basket for frying food products, comprising, a basket having side walls and a bottom wall, a least one portion of the bottom wall being movable from a closed position relative to the side walls to an open position relative to the side walls, a handle mounted to the basket and having a handgrip portion extending therefrom, a latch mechanism mounted to the basket adjacent the handle and including a lever member movable from a first position to a second position, a bracket mounted to the side wall of the basket, the lever member being pivotally mounted to the bracket, the lever member having a lower portion from which a latch member extends to a first blocking position beneath the at least one portion of the bottom wall when the lever member is in the first position to thereby retain the at least one portion in the closed position thereof, resilient means mounted to the basket for continuously urging the lever member toward the first position, the lever member having an upper end extending from the basket toward the handgrip of the handle so that the upper end of the lever member may be manually engaged to thereby move the lever member to the second position wherein the latch member is moved to a non-blocking position spaced from the at least one portion of the bottom wall so that the at least one portion will open relative to the side walls of the basket to thereby define a discharge opening through which food product within the fryer basket will be discharged.

2. The fryer basket of claim 1 wherein said handgrip portion of the handle and the upper end of the lever are horizontally spaced outwardly relative to the side walls of the basket.

3. The fryer basket of claim 2 wherein the side walls of the basket include opposing side walls, opposing front and rearnd walls, and the handle being mounted to the front wall such that the handgrip portion of the handle extends from the front wall.

4. The fryer basket of claim 3 wherein the resilient means is mounted to the basket between the bracket and the upper end of the lever member.

5. The fryer basket of claim 1 wherein the bottom wall includes two panels which are pivotally mounted to opposite side walls of the basket.

6. The fryer basket of claim 1 wherein the upper end of the lever member includes a push member that is spaced outwardly of the side walls.

7. A fryer basket for use in frying food products comprising a basket having a front wall, rear wall and opposite side walls, a bottom wall pivotally mounted to at least one of the opposite side walls so as to be movable from a first position closing the bottom wall relative to the opposite sides and front and rear walls to a second position wherein the bottom wall is open relative to the front, rear and side walls, a handle extending from the front wall and having a handgrip portion, a latch mechanism pivotally mounted to the front wall of the basket and including an upper portion adjacent the handgrip and a lower latch member that, in a first position of the latch mechanism is in a first blocking position to prevent the bottom wall from moving from the first position thereof, and the latch member being movable to a second non-blocking position spaced from the bottom wall by movement of the latch mechanism to a second position thereof whereby the bottom wall freely pivots to the open position thereof, and resilient means mounted to the basket for continuously urging the latch mechanism toward the first position thereof.

8. The fryer basket of claim 7 wherein the bottom wall includes two panels which are pivotally mounted to the opposite side walls of the basket.

9. The fryer basket of claim 8 wherein the resilient means is mounted to the front wall of the basket for continuously urging the latch mechanism and the latch member toward the first positions thereof.

10. A fryer basket for use in frying food products comprising a basket having outer peripheral walls and at least one bottom wall that is pivotally mounted to at least one of the peripheral walls so as to be movable from a first position closing the bottom wall relative to the peripheral walls to a second position wherein the at least one bottom wall is open relative to the peripheral walls, a handle extending from one of the peripheral walls and having a handgrip portion, a latch mechanism pivotally mounted to one of the peripheral walls of the basket and including an upper portion adjacent the handgrip and a lower latch member that, in a first position of the latch mechanism is in a blocking position to prevent the at least one bottom wall from moving from the first position thereof, the latch member being movable to a non-blocking position spaced from the at least one bottom wall by movement of the latch mechanism to a second position whereby the at least one bottom wall freely pivots to the open position thereof, and resilient means mounted to the basket for continuously urging the latch mechanism toward the first position thereof.

11. The fryer basket of claim 10 including two bottom walls which are pivotally mounted to opposite peripheral walls of the basket.

12. The fryer basket of claim 11 wherein the latch member is bifurcated.

\* \* \* \* \*